(12) United States Patent
Kang et al.

(10) Patent No.: US 9,244,486 B2
(45) Date of Patent: Jan. 26, 2016

(54) FLEXIBLE TOUCH SCREEN PANEL

(71) Applicant: Samsung Display Co., Ltd., Gyeonggi-do (KR)

(72) Inventors: Sung-Ku Kang, Yongin (KR); Jung-Yun Kim, Yongin (KR); Mi-Ae Park, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 199 days.

(21) Appl. No.: 14/017,817

(22) Filed: Sep. 4, 2013

(65) Prior Publication Data

US 2014/0069796 A1   Mar. 13, 2014

(30) Foreign Application Priority Data

Sep. 11, 2012   (KR) .......................... 10-2012-0100605

(51) Int. Cl.
*G06F 1/16*     (2006.01)
*G06F 3/044*    (2006.01)

(52) U.S. Cl.
CPC ................ *G06F 1/16* (2013.01); *G06F 1/1652* (2013.01); *G06F 3/044* (2013.01)

(58) Field of Classification Search
CPC ................................. G06F 3/041; G06F 3/044
USPC .................................. 200/600; 345/173, 174
See application file for complete search history.

(56) References Cited

U.S. PATENT DOCUMENTS

| 2010/0134436 | A1  | 6/2010 | Jeong et al. |
| 2010/0134439 | A1* | 6/2010 | Ito et al. ........................ 345/174 |
| 2010/0182256 | A1  | 7/2010 | Jeong et al. |
| 2010/0182259 | A1  | 7/2010 | Jung et al. |
| 2011/0090170 | A1* | 4/2011 | Lin et al. ........................ 345/174 |
| 2011/0102346 | A1* | 5/2011 | Orsley et al. .................. 345/173 |
| 2011/0102370 | A1  | 5/2011 | Kono et al. |
| 2011/0134052 | A1* | 6/2011 | Tsai et al. ...................... 345/173 |
| 2011/0193796 | A1* | 8/2011 | Cho et al. ...................... 345/173 |
| 2011/0216018 | A1* | 9/2011 | Kim et al. ...................... 345/173 |

FOREIGN PATENT DOCUMENTS

| KR | 10-1022087    | 3/2011  |
| KR | 10-1022105    | 3/2011  |
| KR | 10-2011-0051208 A | 5/2011 |
| KR | 10-1073285    | 10/2011 |

* cited by examiner

*Primary Examiner* — Edwin A. Leon
*Assistant Examiner* — Iman Malakooti
(74) *Attorney, Agent, or Firm* — Lee & Morse, P.C.

(57) ABSTRACT

A flexible touch screen panel includes a substrate divided into an active area, a first non-active area, and a second non-active area, a plurality of sensing electrodes in the active area, a plurality of position detecting lines in the first non-active area and connected to the sensing electrodes, a plurality of connecting units in the second non-active area and connected to the plurality of position detecting lines and the connecting units are multiple layer structure wiring lines, a pad unit including a plurality of pads in the second non-active area and the pad unit is connected to the plurality of connecting units, and an insulating layer in the active area, overlapping the first non-active area, and excluded from the second non-active area.

12 Claims, 2 Drawing Sheets

FLEXIBLE TOUCH SCREEN PANEL

CROSS-REFERENCE TO RELATED APPLICATION

This application claims priority under 35 U.S.C. §119 to Korean Patent Application No. 10-2012-0100605, filed on Sep. 11, 2012, in the Korean Intellectual Property Office, the entire content of which is incorporated herein by reference.

BACKGROUND

A touch screen panel is an input device capable of selecting the indication content displayed on a screen of an image display device by, e.g., a human hand or an object, to input a command of a user. The touch screen panel may replace an additional input device coupled to the image display device such as a keyboard and a mouse. Accordingly, the range of use of the touch screen panel is gradually increasing.

SUMMARY

Embodiments may be realized by providing a flexible touch screen panel that includes a substrate partitioned into an active area and first and second non-active areas formed outside the active area, a plurality of sensing electrodes formed in the active area, a plurality of position detecting lines formed in the first non-active area and connected to the sensing electrodes, a plurality of connecting units formed in the second non-active area and connected to the plurality of position detecting lines, a pad unit including a plurality of pads formed in the second non-active area and connected to the plurality of connecting units, and an insulating layer formed in the active area excluding the second non-active area and an area that overlaps the first non-active area. The connecting units are realized by multiple layer structure wiring lines.

The sensing electrodes may include a plurality of first sensing electrodes formed in a first direction to be arranged in a second direction that intersects the first direction, and a plurality of second sensing electrodes formed in the second direction to be arranged in the first direction.

The first sensing electrodes may include a plurality of first sensing cells arranged in the first direction and first connecting patterns for connecting the first sensing cells to each other. The second sensing electrodes may include a plurality of second sensing cells arranged in the second direction and second connecting patterns for connecting the second sensing cells to each other.

The first sensing cells and the second sensing cells may be in a mesh including a plurality of apertures. At this time, the first and second sensing electrodes may be formed of an opaque metal material.

The position detecting lines may include first position detecting lines connected to the first sensing electrodes and second position detecting lines connected to the second sensing electrodes. The first sensing electrodes and the first position detecting lines connected to the first sensing electrodes may be formed on one surface of the substrate. The second sensing electrodes and the second position detecting lines connected to the second sensing electrodes may be formed on the insulating layer.

The connecting units may include first connecting units connected to the first position detecting lines and second connecting units connected to the second position detecting lines. The first connecting unit may include a first lower wiring line formed on the substrate, and a first upper wiring line that overlaps the first lower wiring line and whose one end is extended onto the insulating layer.

The first lower wiring line may be realized by the first position detecting line formed on the substrate of the first non-active area being extended to the second non-active area. The first upper wiring line may be simultaneously formed with the second sensing electrodes and the second position detecting lines.

The second connecting unit may include a second lower wiring line that is formed on the substrate and whose one end is partially extended under the insulating layer, and a second upper wiring line that overlaps the second lower wiring line and that is connected to the second position detecting line formed on the insulating layer.

The second upper wiring line may be realized by the second position detecting line formed on the insulating layer of the first non-active area being extended to the second non-active area. The second lower wiring line may be simultaneously formed with the first sensing electrodes and the first position detecting lines.

The substrate may be a thin film.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
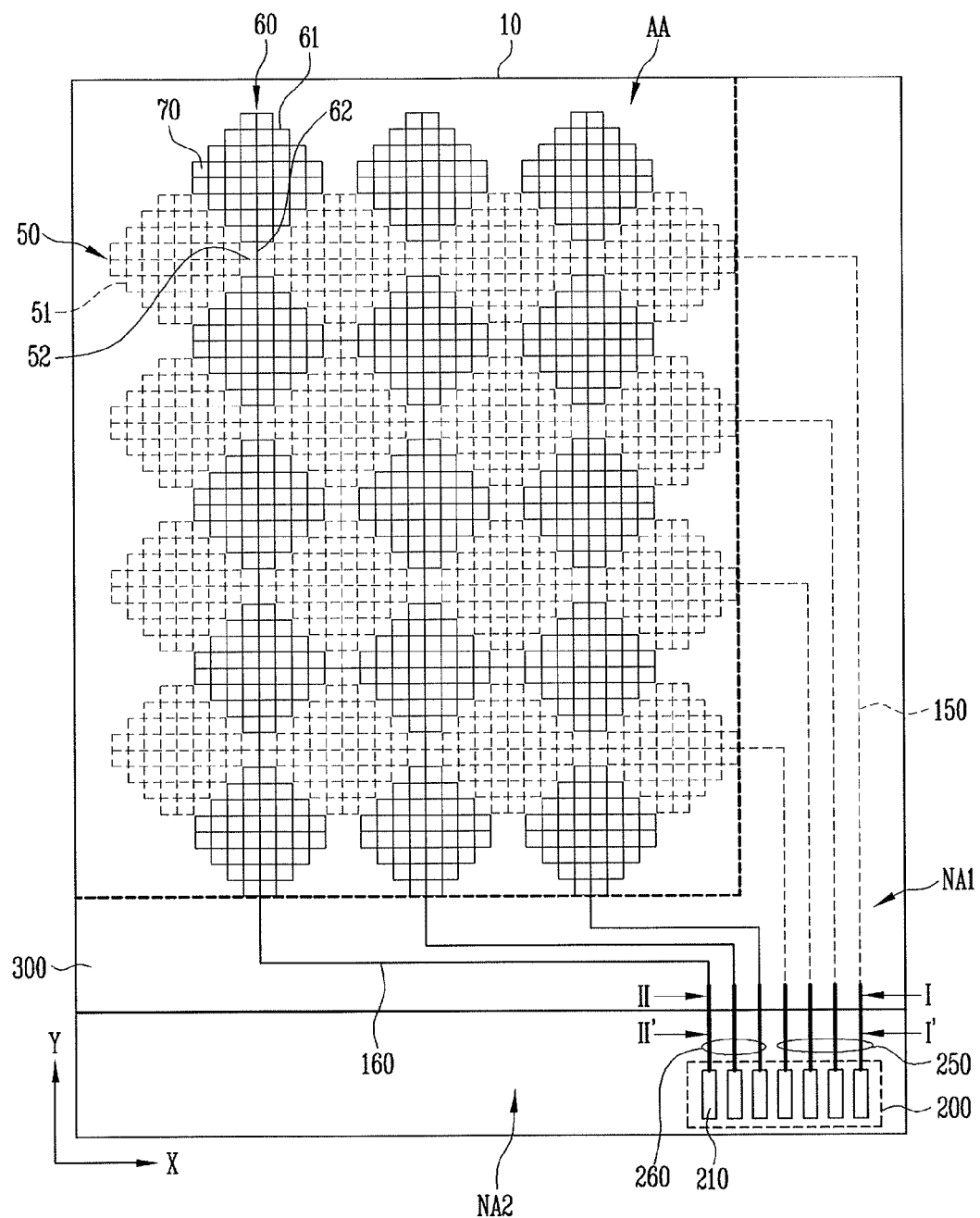
FIG. 1 is a plan view illustrating a touch screen panel according to an exemplary embodiment.

Korean Patent Application No. 10-2012-0100605, filed on Sep. 11, 2012, in the Korean Intellectual Property Office, and entitled: "Flexible Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2A:
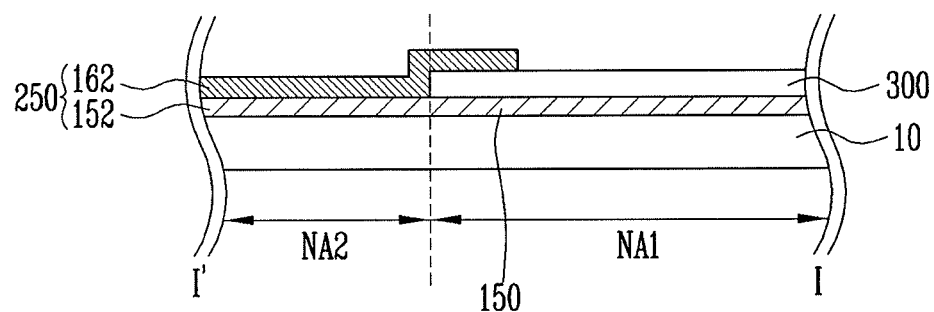
FIGS. 2A and 2B are sectional views of specific areas I-I' and II-II', respectively, of the touch screen panel illustrated in FIG. 1.
Figure 2B:
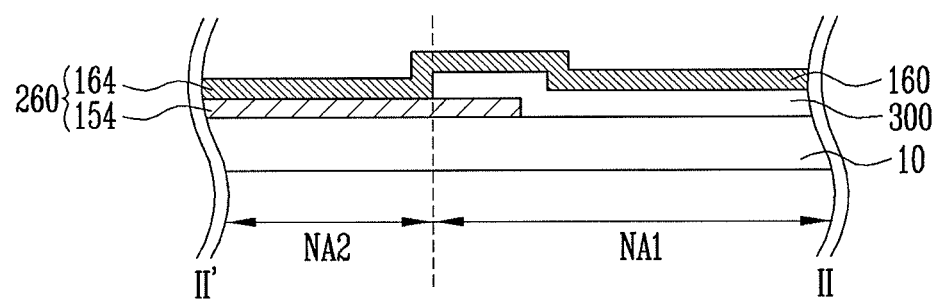

FIG. 1 is a plan view illustrating a touch screen panel according to an exemplary embodiment. FIGS. 2A and 2B are sectional views of specific areas I-I' and II-II', respectively, of the touch screen panel illustrated in FIG. 1.

Referring to FIGS. 1, 2A, and 2B, the touch screen panel according to an exemplary embodiment includes a flexible substrate 10, e.g., a thin film, first and second sensing electrodes 50 and 60 formed on at least one surface of the substrate 10, and first and second position detecting lines 150 and 160 for electrically connecting the first and second sensing electrodes 50 and 60 to a plurality of pads 210 positioned in a pad unit 200.

According to the exemplary embodiment, first and second connecting units 250 and 260 for connecting the first and second position detecting lines 150 and 160, respectively, and the pads 210 to each other are further included. The first and second connecting units 250 and 260 may be realized by multiple layer structured wiring lines.

An area in which the plurality of sensing electrodes 50 and 60 are formed is an active area AA in which an image is displayed to detect a touch position. An area in which the position detecting lines 150 and 160 are electrically connected to the sensing electrodes 220, and an area in which the connecting units 250 and 260, and a pad unit 200 are formed, is a non-active area NA provided outside the active area AA.

In addition, according to the exemplary embodiment, the non-active area NA is divided into a first non-active area NA1 in which the position detecting lines 150 and 160 are formed, and a second non-active area NA2 that is positioned outside the first non-active area NA1 and in which the pad unit 200 and the connecting units 250 and 260 for connecting the position detecting lines 150 and 160 and the pads 210 provided in the pad unit 200 to each other are formed.

As illustrated in FIG. 1, the first sensing electrodes 50 may be longitudinally formed in a first direction (for example, an X axis direction) so that the plurality of first sensing electrodes 50 may be arranged in a second direction (for example, an Y axis direction) that intersects the first direction.

In addition, the second sensing electrodes 60 may be longitudinally formed in the second direction so that the plurality of second sensing electrodes 60 may be arranged in the first direction.

The sensing electrodes 50 and 60 according to the exemplary embodiment may be formed of a ductile opaque conductive material instead of a transparent conductive material (for example, ITO) of which the conventional sensing electrodes are formed. Accordingly, the possibility of a crack being generated in the sensing electrodes when the flexible touch screen panel is curved or folded so that defective operation is caused is reduced and/or prevented.

At this time, low resistance metals such as Ag, Al, Cu, Cr, and Ni as opaque metals or a nano metal conductive layer such as nano wire (AgNW) may be used as the conductive material of which the sensing electrodes 50 and 60 are formed. However, the conductive material is not limited to the above.

That is, ITO used as the conventional sensing electrodes lacks in flexibility so that a crack is easily generated when ITO is applied to the flexible touch screen panel. However, according to the exemplary embodiment, when the opaque metal is used, the possibility of a crack being generated is less than when ITO is used. Therefore, the opaque metal may be easily applied to the flexible touch screen panel.

In addition, when the sensing electrodes 50 and 60 are formed of a metal having lower resistance than ITO, RC delay may be reduced.

When the sensing electrodes 50 and 60 are formed of the opaque metal, characteristic metal reflection gloss and surface reflectance are increased, which may be visualized by a user, so that it may be difficult to realize a high quality product. Accordingly, to realize a high quality product, a flexible polarizing film (not shown) is formed on the substrate 10 where the sensing electrodes 50 and 60 are formed. The flexible polarizing film may reduce and/or remove the characteristic metal reflection gloss and the reflectance. Therefore, it is possible to reduce the possibility of and/or prevent the sensing electrodes from being visualized.

At this time, the substrate 10 on which the sensing electrodes are formed is a flexible low retardation film positioned under a polarizing film and may be realized by a cast polycarbonate (PC) film and a cyclic polyolefin (COP) film.

In addition, the substrate 10 may function as a retardation film provided in the polarizing film. In this case, the substrate 10 may be realized by a retardation PC film, an oriented poly propylene (OPP) film, or a poly vinyl alcohol (PVA) film.

In addition, according to the exemplary embodiment, in order to use the opaque conductive material as the sensing electrodes, as illustrated in FIG. 1, the sensing electrodes 50 and 60 are formed in a mesh, e.g., arranged as a mesh pattern. For example, each of the electrodes 50 and 60 may be formed with a mesh pattern.

For example, referring to FIG. 1, the first sensing electrodes 50 may include a plurality of first sensing cells 51 arranged in the first direction and first connecting patterns 52 for electrically connecting the first sensing cells 51 to each other. The second sensing electrodes 60 may include a plurality of second sensing cells 61 arranged in the second direction and second connecting patterns 62 for electrically connecting the second sensing cells 61 to each other.

In addition, a plurality of apertures 70 are formed in the first sensing cells 51, the second sensing cells 61, the first connecting patterns 52, and the second connecting patterns 62 so that the sensing electrodes in the mesh may be realized.

At this time, the first sensing cells 51 and the second sensing cells 61 may be diamond-shaped. However, the shape of the sensing cells is not limited to the above.

In particular, a display device in which a plurality of pixels are regularly arranged to display an image is provided under the substrate 10 on which the sensing cells are formed. In this case, when the shape and arrangement of the sensing cells have regularity, since Moire phenomenon is generated by interference with the pixels in the display device so that display quality may be deteriorated, the frames of the sensing cells 51 and 52 may be randomly curved to reduce the possibility of and/or prevent the display quality from being deteriorated.

Referring to FIG. 1, the sensing cells 51 and 52 are illustrated as diamond-shaped. However, the shapes of the sensing cells 51 and 52 are not limited thereto.

The first position detecting lines 150 are connected to one end of each of the first sensing electrodes 50, the second position detecting lines 160 are connected to one end of each of the second sensing electrodes 60, and the first position detecting lines 150 and the second position detecting lines 160 may transmit signals detected from the sensing electrodes 50 and 60 to an external touch driving circuit (not shown) through the first and second connecting units 250 and 260 and the pads 210 provided in the pad unit 200. That is, the touch driving circuit that receives the signals through the first position detecting lines 150 and the second position detecting lines 160 may grasp the touch position of the user.

According to an exemplary embodiment, the first position detecting lines 150 may be formed of the same material as the first sensing electrodes 50 connected thereto and the second position detecting lines 160 may be formed of the same material as the second sensing electrodes 60 connected thereto. Therefore, since the position detecting lines 150 and 160 may be formed through the same process as the sensing electrodes 50 and 60, processes may be simplified.

The first sensing electrodes 50 and the first position detecting lines 150 connected to the first sensing electrodes 50 may be formed on one surface of the substrate 10. The second sensing electrodes 60 and the second position detecting lines 160 connected to the second sensing electrodes 60 may be formed on an insulating layer 300.

Therefore, the insulating layer 300 may be realized by two layer structured sensing electrodes formed between the first sensing electrodes 50 and the second sensing electrodes 60. For example, the two layer structure may have simpler processes than a one layer structure in which additional insulating patterns are formed in parts where the first sensing electrodes 50 and the second sensing electrodes 60 intersect each other, that is, between the first connecting patterns 52 and the second connecting patterns 62.

Accordingly to an exemplary embodiment, the insulating layer 300 is formed only in an area that overlaps the active area AA and the first non-active area NA1 as illustrated in FIG. 1. The insulating layer 300 is not formed in the second non-active area NA2 where the pad unit 200 and the connecting units 250 and 260 are formed. The insulating layer 300 is formed in such a manner so as to easily compress the pad unit 200 with a flexible printed circuit board (FPCB) (not shown) mounted with a touch driving circuit.

That is, when the insulating layer 300 is extended to the second non-active area NA2, since an additional patterning process must be performed on the area of the insulating layer that overlaps the pads 210 so that the plurality of pads 210 provided in the pad unit 200 are exposed, processes are complicated and time and cost are spent. According to an exemplary embodiment, the insulating layer 300 is not extended to the second non-active area NA2, but is formed only in the area that overlaps the first non-active area NA1.

In this case, since the first connecting units 250 connected between the first position detecting lines 150 and the pads 210 are positioned in the second non-active area NA2 and are not protected by the insulating layer 300 to be exposed as illustrated in FIG. 1, the first connecting units 250 may be shorted by over etching during a process of patterning the second sensing electrodes 60 positioned on the insulating layer 300 and the second position detecting lines 160.

In addition, since the second position detecting lines 160 are formed on the insulating layer 300 and the second connecting units 260 are positioned in the second non-active area NA2 at the edge of the insulating layer 300, connection between the second position detecting lines 160 and the second connecting units 260 connected between the second position detecting lines 160 and the pads 210 may be broken due to step difference caused by the thickness of the insulating layer 300.

According to an exemplary embodiment, the first and second connecting units 250 and 260 for connecting the first and second position detecting lines 150 and 160, respectively, and the pads 210 to each other are realized by multiple layer structured wiring lines.

The detailed structure of the sections of the first and second connecting units 250 and 260 will be described in detail with reference to FIGS. 2A and 2B.

FIG. 2A is a view illustrating the structure of the section of the first connecting unit 250. As illustrated in FIG. 2A, the first connecting unit 250 is realized by multiple layer structured wiring lines of a first lower wiring line 152 formed on the substrate 10 and a first upper wiring line 162 that overlaps the first lower wiring line 152 and whose one end extends to the insulating layer 300.

At this time, the first lower wiring line 152 is integrated with the first position detecting line 150 as illustrated in FIG. 2, and the first position detecting line 150 formed on the substrate 10 of the first non-active area NA1 is extended to the second non-active area NA2. That is, the first lower wiring line 152 is the first position detecting line 150 extending to the second non-active area NA2 in which the insulating layer 300 is not formed.

As described above, when the first connecting units 250 are realized only by the first lower wiring lines 152, since the first connecting units 250 may be shorted by over etching during the process of patterning the second sensing electrodes 60 positioned on the insulating layer 300 and the second position detecting lines 160. Therefore, according to an exemplary embodiment, the first upper wiring line 162 is formed in the upper part of the first connecting unit 250 to overlap the first lower wiring line 152.

The first upper wiring line 162 may be simultaneously formed with the second sensing electrodes 60 and the second position detecting lines 160. Since the first upper wiring lines 162 may be formed to reduce the possibility of and/or prevent the first lower wiring lines 152 in which the first position detecting lines 150 are extended to the second non-active area NA2 from being over etched, the first upper wiring lines 162 are floated, that is, are not electrically connected to the second position detecting lines 160.

Therefore, as illustrated in FIG. 2A, the first upper wiring line 162 overlaps the first lower wiring line 152 corresponding to the first upper wiring line 162 and one end of the first upper wiring line 162 is extended onto the insulating layer 300 to be broken.

FIG. 2B illustrates the structure of the section of the second connecting unit 260. As illustrated in FIG. 2B, the second connecting unit 260 is realized by multiple layer structured wiring lines of a second lower wiring line 154 that is formed on the substrate 10 and whose one end is partially extended under the insulating layer 300 and a second upper wiring line 164 that overlaps the second lower wiring line 154 and that is connected to the second position detecting line 160 formed on the insulating layer 300.

At this time, the second upper wiring line 164 is integrated with the second position detecting line 160 as illustrated in FIG. 2, and the second position detecting line 160 formed on the insulating layer 300 of the first non-active area NA1 is extended to the second non-active area NA2. That is, the second upper wiring line 164 is the second position detecting line 160 extending to the second non-active area NA2 in which the insulating layer 300 is not formed.

As described above, when the second connecting units 260 are realized only by the first upper wiring lines 164, since connection between the second position detecting lines 160 and the second connecting units 260 may be broken due to step difference caused by the thickness of the insulating layer 300. Therefore, according to an exemplary embodiment, the second lower wiring line 154 is formed in the lower part of the second connecting unit 260 to overlap the second upper wiring line 164.

At this time, the second lower wiring line 154 is simultaneously formed with the first sensing electrodes 50 and the first position detecting lines 150. Since the second lower wiring lines 154 are formed to compensate for the step difference of the second upper wiring lines 164 in which the second position detecting lines 160 are extended to the second non-active area NA2, the second lower wiring lines 154 are floated, that is, are not electrically connected to the first position detecting lines 150.

Therefore, as illustrated in FIG. 2B, the second lower wiring line 154 overlaps the second upper wiring line 164 corresponding to the second lower wiring line 154 and one end of the second lower wiring line 164 is extended under the insulating layer 300 to be broken.

By way of summation and review, the touch screen panel may be provided on substantially an entire surface an image display device to convert a contact position of, e.g., a human hand or an input object, into an electrical signal. Therefore, the instruction contact selected in the contact position is received as an input signal. The touch screen panel may be attached to the external surface of an image display device such as a liquid crystal display (LCD) and an organic light emitting display. Therefore, the touch screen panel requires high transparency and small thickness.

Methods of realizing a touch screen panel include, e.g., a resistance layer method, a photo-sensing method, and an electro-capacitive method. Among the above methods, the electro-capacitive touch screen panel detects a change in capacitance formed by conductive sensing electrodes together with other peripheral sensing electrodes or a ground electrode when the human hands or the input object contacts the touch screen panel to convert the contact position into the electrical signal. In addition, a flexible image display device is being developed. In this case, the touch screen panel is attached to the flexible image display device such that the touch screen panel has flexible characteristic.

In the conventional touch screen panel, sensing electrodes are realized using a transparent conductive material such as indium tin oxide (ITO). However, in this case, when the flexible touch screen panel is curved or folded, cracks may be generated in the sensing electrodes so that defective operation may be caused. Further, in the conventional touch screen panel, since a thin film forming process and a pattern forming process are used for forming the sensing electrodes, high heat resistance and high chemical resistance are sought so that the sensing electrodes are formed on a glass substrate that satisfies the process characteristics. However, in this case, since the glass substrate must have a thickness of no less than a predetermined value so that the glass substrate may be carried in the processes, it is not possible to satisfy the characteristic that requires the small thickness and to realize the flexible characteristic.

In contrast, embodiments relate to a touch screen panel and a flexible touch screen panel having improved characteristics. For example, embodiments relate to providing a flexible touch screen panel in which sensing electrodes, as touch sensors, are formed on at least one surface of a flexible substrate, e.g., a thin film, and the sensing electrodes are realized in a flexible conductive mesh so that it is possible to secure a ductile characteristic and to reduce thickness.

Embodiments also relate to providing a flexible touch screen panel in which connecting units for connecting position detecting lines connected to the sensing electrodes and pads compressed with an external touch driving circuit are realized by multiple layer structured wiring lines so that the possibility of a short being caused by over etching may be reduced and/or prevented.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A flexible touch screen panel, comprising:
a substrate divided into an active area, a first non-active area, and a second non-active area, the first and second non-active areas being outside the active area;
a plurality of sensing electrodes in the active area, the sensing electrodes including:
a plurality of first sensing electrodes formed in a first direction to be arranged in a second direction that intersects the first direction; and
a plurality of second sensing electrodes formed in the second direction to be arranged in the first direction;
a plurality of position detecting lines in the first non-active area and connected to the sensing electrodes, the position detecting lines including first position detecting lines connected to the first sensing electrodes and second position detecting lines connected to the second sensing electrodes;
a plurality of connecting units in the second non-active area and connected to the plurality of position detecting lines, the connecting units being multiple layer structure wiring lines, the connecting units including first connecting units connected to the first position detecting lines and second connecting units connected to the second position detecting lines;
a pad unit including a plurality of pads in the second non-active area, the pad unit being connected to the plurality of connecting units; and
an insulating layer in the active area and overlapping the first non-active area, the insulating layer being excluded from the second non-active area, the first connecting units including a first lower wiring line on the substrate and a first upper wiring line that overlaps the first lower wiring line and that has one end extending onto the insulating layer, the first upper wiring line being simultaneously formed with the second sensing electrodes and the second position detecting lines.

2. The flexible touch screen panel as claimed in claim 1, wherein:
the first sensing electrodes include a plurality of first sensing cells arranged in the first direction and first connecting patterns for connecting the first sensing cells to each other, and
the second sensing electrodes include a plurality of second sensing cells arranged in the second direction and second connecting patterns for connecting the second sensing cells to each other.

3. The flexible touch screen panel as claimed in claim 2, wherein the first sensing cells and the second sensing cells are arranged in a mesh including a plurality of apertures.

4. The flexible touch screen panel as claimed in claim 3, wherein the first and second sensing electrodes are formed of an opaque metal material.

5. The flexible touch screen panel as claimed in claim 1, wherein:
the first sensing electrodes and the first position detecting lines connected to the first sensing electrodes are on one surface of the substrate, and
the second sensing electrodes and the second position detecting lines connected to the second sensing electrodes are on the insulating layer.

6. The flexible touch screen panel as claimed in claim 1, wherein the substrate is a thin film.

7. A flexible touch screen panel, comprising:
a substrate divided into an active area, a first non-active area, and a second non-active area, the first and second non-active areas being outside the active area;
a plurality of sensing electrodes in the active area, the sensing electrodes including:
a plurality of first sensing electrodes formed in a first direction to be arranged in a second direction that intersects the first direction; and a plurality of second sensing electrodes formed in the second direction to be arranged in the first direction;

a plurality of position detecting lines in the first non-active area and connected to the sensing electrodes, the position detecting lines including first position detecting lines connected to the first sensing electrodes and second position detecting lines connected to the second sensing electrodes;

a plurality of connecting units in the second non-active area and connected to the plurality of position detecting lines, the connecting units being multiple layer structure wiring lines, the connecting units including first connecting units connected to the first position detecting lines and second connecting units connected to the second position detecting lines;

a pad unit including a plurality of pads in the second non-active area, the pad unit being connected to the plurality of connecting units; and an insulating layer in the active area and overlapping the first non-active area, the insulating layer being excluded from the second non-active area, wherein the second connecting units include a second lower wiring line on the substrate, which second lower wiring line has one end that partially extends from the second non-active region to under the insulating layer in the first non-active region, and includes a second upper wiring line that overlaps the second lower wiring line in the second non-active region, which second upper wiring line is connected to one of the second position detecting lines on the insulating layer.

8. The flexible touch screen panel as claimed in claim 7, wherein the second upper wiring line is an extension of one of the second position detecting lines on the insulating layer in the first non-active area, which extension is in the second non-active area.

9. The flexible touch screen panel as claimed in claim 7, wherein the second lower wiring line is simultaneously formed with the first sensing electrodes and the first position detecting lines.

10. The flexible touch screen panel as claimed in claim 7, wherein the first connecting units include a first lower wiring line on the substrate and includes a first upper wiring line that overlaps the first lower wiring line and that has one end extending onto the insulating layer.

11. The flexible touch screen panel as claimed in claim 10, wherein the first lower wiring line is an extension of one of the first position detecting lines on the substrate in the first non-active area, which extension is in the second non-active area.

12. The flexible touch screen panel as claimed in claim 10, wherein the first upper wiring line is simultaneously formed with the second sensing electrodes and the second position detecting lines.

* * * * *